Patented Sept. 5, 1922.

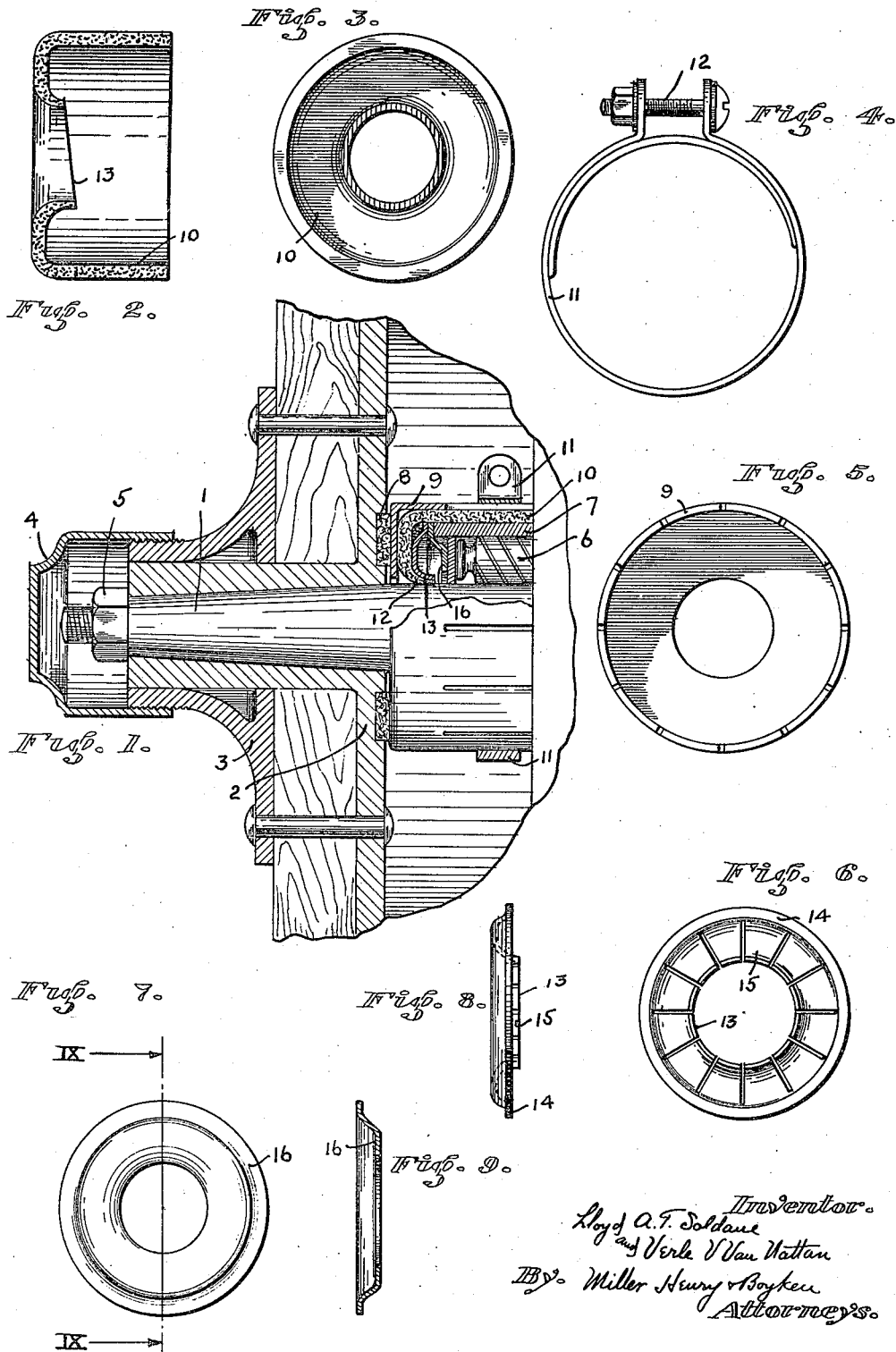

1,428,267

UNITED STATES PATENT OFFICE.

LLOYD A. T. SOLDANE AND VERLE V. VAN NATTAN, OF SAN FRANCISCO, CALIFORNIA.

GREASE RETAINER AND DUST CAP.

Application filed January 24, 1922. Serial No. 531,388.

*To all whom it may concern:*

Be it known that we, LLOYD A. T. SOLDANE and VERLE V. VAN NATTAN, both citizens of the United States, and residents of the city and county of San Francisco, State of California, have invented new and useful Improvements in Grease Retainers and Dust Caps, of which the following is a specification.

Our invention has for its object means for preventing the escape of grease or other lubricant from the rotating shaft and bearings of a vehicle and at the same time preventing the ingress of dust. It is particularly applicable to the rear construction of an automobile.

Other objects will appear from the drawings and specifications which follow:

Referring to the drawing, Fig. 1 is a cross section through the center part of the wheel and bearing of the well known Ford automobile, with the rear axle shown in full and with our invention applied thereto. The other parts of the automobile are not shown, being well known.

Fig. 2 is a detail of the cup leather.

Fig. 3 is a front view of the cup leather of Fig. 2.

Fig. 4 is the clamp ring.

Fig. 5 is a full view of the dust cap.

Fig. 6 is a front view of the spring ring.

Fig. 7 is a front view of the journal retaining ring.

Fig. 8 is a side view of Fig. 6.

Fig. 9 is a second view of Fig. 7.

Throughout the figures similar numerals refer to identical parts.

The numeral 1 indicates one of the rear axles of an automobile, as that of the well known Ford car, on the taper end of which is mounted the hub of the wheel 2 and having clamped thereto the bushing 3 and the hub cap 4, which latter covers the screw end and nut 5 of the said axle. The axle 1, is adapted to rotate within the roller bearing, one of the group of rollers being indicated at 6. These are peripherally arranged within the bearing shell 7 which is rigidly connected to the rear construction of the automobile in any well known way. At 8 is shown a felt washer adapted to rub against the dust cap 9 when the wheel and hub 2 rotate.

It will be seen that within the dust cap is mounted the cup leather 10 which clamps against the stationary element 7 the periphery of the dust cap 9 being pressed against the external surface of 7 by the clamp ring 11, which latter is drawn up by the screw and nut 12. It will be seen that the cup leather 10 is formed to cup around and compress against the shaft 1 at 12 by the spring ring 13. This latter is preferably formed with a continuous annular outer portion 14 having extended inwardly therefrom a series of curved leaves as 15 which form a spring for the purpose of forcing the inner portion of the cup leather 10 against the shaft with a slight compression at 12.

At 16 is shown the journal retaining ring by which the rollers 6 are retained in their proper alignment without interfering with the cup leather 10.

Referring particularly to the inner part of the cup leather at 13 it will be seen that this is cut on an angle so that the shaft in rotating will more efficiently be wiped by the angular positioned edge 13 of the said lever (see Fig. 2).

The manner of fitting and operating is as follows:

The hub cap 4 is first removed, the nut 5 separated from the shaft 1 and the hub 2 pulled clear of the shaft. The journal retaining ring 16 is then inserted against the stationary member 17. The spring ring is next set in place within the cup leather and the two parts thus assembled are slipped over the stationary element 17. The dust cap is then slipped over the outside of the cup leather and the clamp ring 11 adjusted and securely fixed by tightening the screw 12. The wheel and hub with its felt washer 8 are next put in place on the shaft, secured and the hub cap 4 replaced. The apparatus is now ready for operation. It will be seen that by our invention grease or lubricant within the journal and around the roller 6 is prevented from getting out by the wiping effect of the angular edge 13 of the cup leather 10; also by the wiping effect of the belt washer 8 against the dust cap 9 the dust is prevented from getting in and contaminating the lubricant and injuring the parts.

We claim:

1. As an article of manufacture, a cup shaped packing member formed to fit within a dust cap, a dust cap, an inner projecting collar formed within said member and concentric with the periphery thereof, clamp means to secure said dust cap on said cup member and to compress the latter against a relatively stationary part of a vehicle, a spring member constructed and adapted to normally compress said collar, and a bearing retainer ring adapted to cover said spring member.

2. As an article of manufacture, a cup shaped packing member formed to fit within a dust cap, a dust cap, an inner projecting collar formed within said member and concentric with the periphery thereof, clamp means to secure said dust cap on said cup member and to compress the latter against a relatively stationary part of a vehicle, a spring member constructed and adapted to normally compress said collar, and a bearing retainer ring adapted to cover said spring member, the inner edge of said collar presenting a wiping edge making an acute angle with the axis of the cup member.

3. In combination with a wheel and axle of a vehicle, a cup shaped packing member formed to fit within a dust cap, a dust cap, an inner projecting collar formed within said member and concentric with the periphery thereof, clamp means to secure said dust cap on said cup member and to compress the latter against a relatively stationary part of a vehicle, a spring member constructed and adapted to normally compress said collar, and a bearing retainer ring adapted to cover said spring member.

4. In combination with a wheel and axle of a vehicle, a cup shaped packing member formed to fit within a dust cap, a dust cap, an inner projecting collar formed within said member and concentric with the periphery thereof, clamp means to secure said dust cap on said cup member and to compress the latter against a relatively stationary part of a vehicle, a spring member constructed and adapted to normally compress said collar, and a bearing retainer ring adapted to cover said spring member, the inner edge of said collar representing a wiping edge making an acute angle with the axis of the cup member.

5. In combination with a wheel and axle of a vehicle, packing means as set forth in claim 1 and a felt washer between said dust cap and said wheel.

6. In combination with a wheel and axle of a vehicle, packing means as set forth in claim 2 and a felt washer between said dust cap and said wheel.

LLOYD A. T. SOLDANE.
VERLE V. VAN NATTAN.